(12) United States Patent
Fukui et al.

(10) Patent No.: US 7,483,243 B2
(45) Date of Patent: Jan. 27, 2009

(54) MAGNETIC HEAD WITH RECESSED PORTION, AND MAGNETIC RECORDING AND REPRODUCTION APPARATUS COMPRISING THE SAME

(75) Inventors: Hiroshi Fukui, Ibaraki-ken (JP); Yoji Maruyama, Saitama (JP); Masafumi Mochizuki, Tokyo (JP); Kaori Suzuki, Tokyo (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 289 days.

(21) Appl. No.: 11/252,913

(22) Filed: Oct. 17, 2005

(65) Prior Publication Data
US 2006/0082931 A1 Apr. 20, 2006

(30) Foreign Application Priority Data
Oct. 15, 2004 (JP) ............................. 2004-301927

(51) Int. Cl.
*G11B 5/127* (2006.01)
(52) U.S. Cl. ..................................... 360/317
(58) Field of Classification Search ................ 360/317, 360/125.04, 125.56, 125.72; 29/603.13, 29/603.14
See application file for complete search history.

(56) References Cited

U.S. PATENT DOCUMENTS

| | | | |
|---|---|---|---|
| 5,075,956 A | 12/1991 | Das | |
| 6,501,618 B1 * | 12/2002 | Kamijima et al. | 360/125.56 |
| 6,646,827 B1 | 11/2003 | Khizroev et al. | |
| 6,785,952 B2 * | 9/2004 | Kamijima | 29/603.13 |
| 6,859,343 B1 * | 2/2005 | Alfoqaha et al. | 360/125.72 |
| 7,100,266 B2 * | 9/2006 | Plumer et al. | 29/603.14 |
| 7,221,538 B2 * | 5/2007 | Kawato et al. | 360/125.04 |
| 2004/0130820 A1 | 7/2004 | Ota | |
| 2004/0150912 A1 | 8/2004 | Kawato et al. | |
| 2004/0218312 A1 * | 11/2004 | Matono | 360/317 |

FOREIGN PATENT DOCUMENTS

| | | |
|---|---|---|
| JP | 2000-019033 | 1/2000 |
| JP | 2000-020913 A | 1/2000 |

OTHER PUBLICATIONS

European Patent Office (EPO) Examination Report dated Mar. 10, 2008 for patent application EP05106752.

* cited by examiner

*Primary Examiner*—Tianjie Chen
(74) *Attorney, Agent, or Firm*—Townsend and Townsend and Crew LLP; Rambod Nader

(57) ABSTRACT

Embodiments of the invention provide a magnetic head which prevents data on a recording medium from being erased even when a stray field is applied. In one embodiment, a magnetic head includes a perpendicular write head having a main pole and an auxiliary pole; and a read head having a lower shield, an upper shield and a magneto-resistive element formed between the lower shield and the upper shield. At least one of the auxiliary pole, lower shield and upper shield has a recessed portion, whose height in an element height direction is lower than the height of edges thereof in a track width direction, on a surface opposite to the air bearing surface.

20 Claims, 16 Drawing Sheets (prior art)

Fig. 5
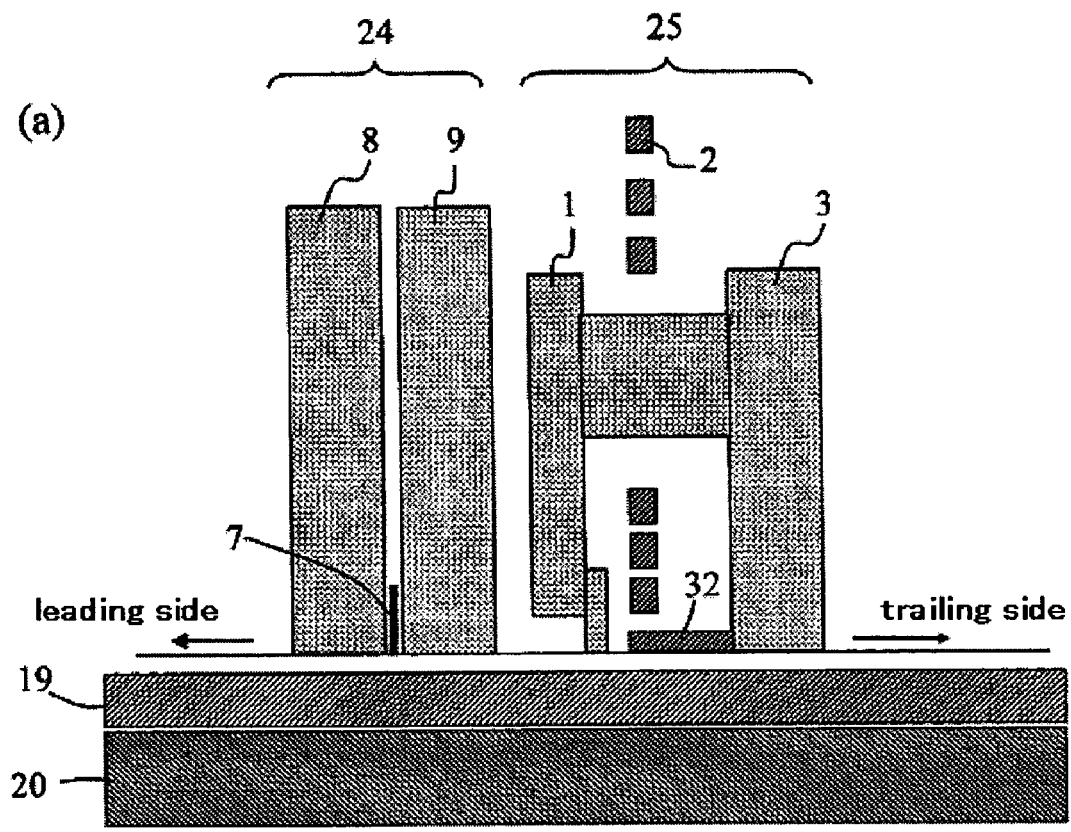
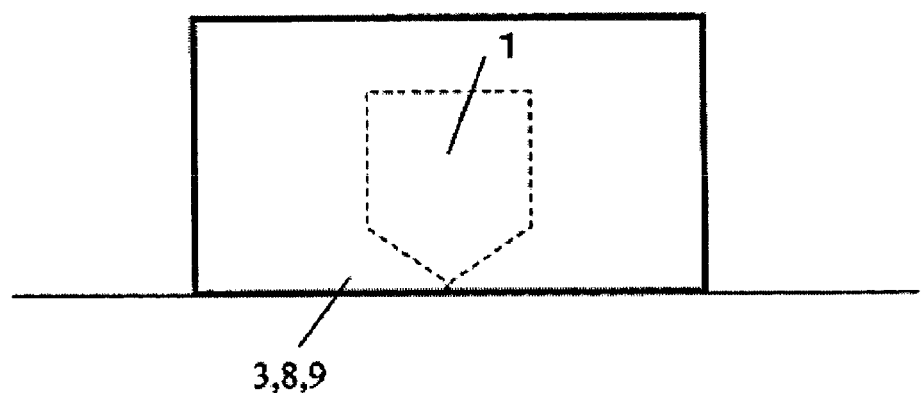

Ratio of the depth of hollow in the element height direction to the distance between the bottom of hollow and the air-bearing surface of the head (L1/L2)[-]

Fig. 1 6
(a)
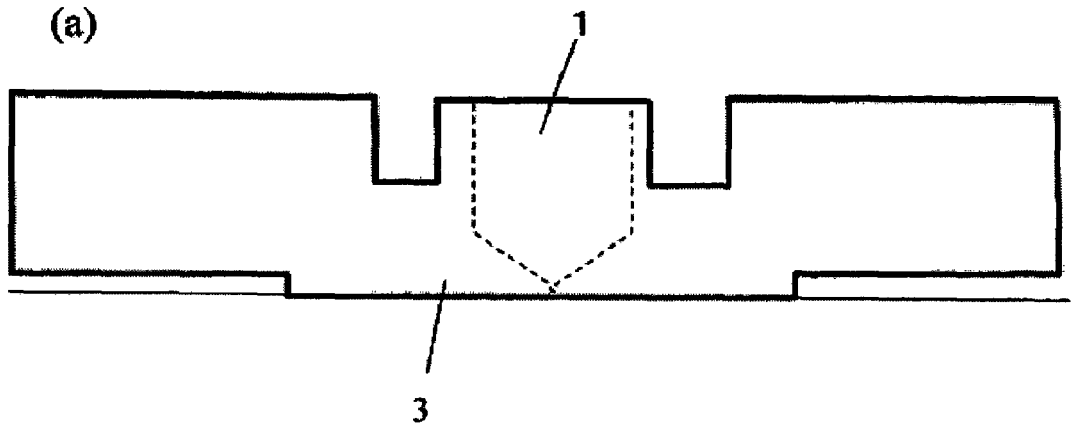
(b)
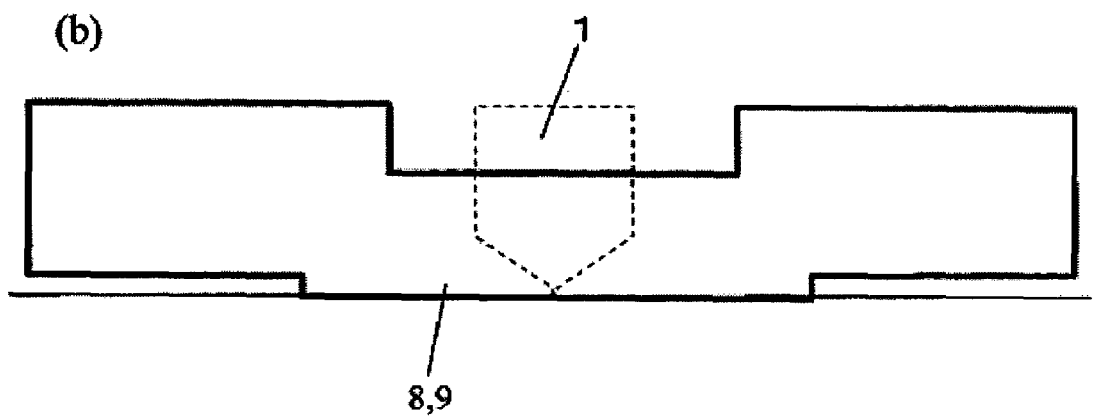
Fig. 1 7
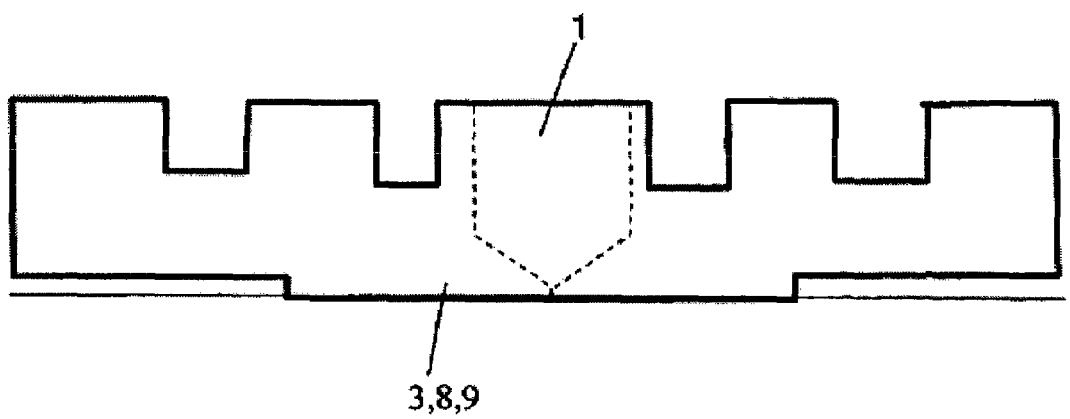

MAGNETIC HEAD WITH RECESSED PORTION, AND MAGNETIC RECORDING AND REPRODUCTION APPARATUS COMPRISING THE SAME

CROSS-REFERENCES TO RELATED APPLICATIONS

This application claims priority from Japanese Patent Application No. JP2004-301927, filed Oct. 15, 2004, the entire disclosure of which is incorporated herein by reference.

BACKGROUND OF THE INVENTION

The present invention relates to a magnetic head for perpendicular recording and a magnetic recording and reproduction apparatus comprising the magnetic head for perpendicular recording.

A magnetic recording and reproduction apparatus comprises a magnetic recording medium and a magnetic head and reads and writes data on the magnetic recording medium with the magnetic head. To increase the recording capacity per unit area of the magnetic recording medium, the surface recording density must be raised. However, according to the current longitudinal recording system, when the bit length to be recorded is small, the surface recording density cannot be raised due to the thermal fluctuation of the magnetization of the medium. A solution to this problem is a perpendicular recording system for recording a magnetization signal in a direction perpendicular to the medium.

The perpendicular recording system is divided into two subsystems: one using a double-layer perpendicular recording medium comprising a soft under layer and the other using a single-layer perpendicular recording medium having no under layer as the recording medium. When the double-layer perpendicular recording medium is used as the recording medium, a stronger magnetic field can be applied to the medium by using a so-called "single-pole head" having a main pole and an auxiliary pole to record data. In consideration of a case where the head has a skew angle, the shape of the air bearing surface of the main pole is desirably trapezoidal with a narrower width on the leading side.

FIGS. 4(a) and 4(b) are structural diagrams of a prior art magnetic head having a single-pole head, wherein FIG. 4(a) is a sectional view and FIG. 4(b) is a plan view when seen from the trailing side. As shown in FIGS. 4(a) and 4(b), the prior art magnetic head comprises a lower shield 8, read element 7, upper shield 9, auxiliary pole 3, thin film coil 2 and main pole 1 in the order named from the traveling direction of the head (leading side). The lower shield 8, read element 7 and upper shield 9 constitute a read head 24 whereas the auxiliary pole 3, thin film coil 2 and main pole 1 constitute a write head (single-pole head) 25. The recording medium has a soft under layer 20 below the magnetic recording layer 19.

JP-A No. 2000-20913 (Patent document 1) discloses a structure that a discontinuous portion is formed in a magnetic film pattern forming a magnetic path in a magnetic recording head.

BRIEF SUMMARY OF THE INVENTION

The present invention relates to a perpendicular recording system comprising a perpendicular recording head having a main pole and an auxiliary pole and a double-layer perpendicular recording medium having an under layer. Since the thin film coil is existent between the read element and the main pole in the magnetic head shown in FIGS. 4(a) and 4(b), the interval between reading and writing becomes large, thereby deteriorating the format efficiency. Therefore, a structure as shown in FIGS. 5(a) and 5(b) having the auxiliary pole 3 arranged at the trailing side of the main pole 1 is being employed. With this structure, the interval between reading and writing can be made small. FIG. 5(a) is a sectional view and FIG. 5(b) is a plan view of the head.

Write field gradients of a magnetic field of the head for determining magnetization transition of recording bits are important factors for realizing high recording density together with the intensity of the magnetic field of the recording head. To achieve higher recording density in the future, the write field gradients must be further increased. A structure having a magnetic substance 32 arranged on the trailing side of the main pole 1 improves the write field gradients. Also in this case, to form a closed magnetic path, the auxiliary pole 3 is desirably arranged on the trailing side of the main pole 1 as shown in FIGS. 5(a) and 5(b).

In the perpendicular recording system having an under layer, there is seen a phenomenon that data recorded on the medium is erased by the influence of a stray (external) field. Especially the present invention provides a solution to the above problem, i.e., the erasure of recorded data when a stray field is applied parallel to the surface of the medium. FIG. 6 shows the structure of the head and the erasure positions of data on the disk when a stray field of $3.98 \times 10^3$ (A/m) is applied to a hard disk drive (HDD) by a coil. The stray field is applied parallel to the disk. The erasure positions of the data are 30 μm away from each other, which corresponds to the widths of the auxiliary pole and read shields (upper shield and lower shield) used in the experiment. FIG. 7 shows a magnetic field around the magnetic recording layer opposed to the auxiliary pole when a stray field is applied parallel to the surface of the medium, which is calculated by 3-D magnetic field computation. It is seen that the magnetic field becomes large at the edge of the return pole.

It is considered from the above that data erasure occurs at the edges of the return pole and the read shields by the stray field. When the stray field is applied parallel to the surface of the medium, it must be taken into consideration that a magnetic flux absorbed by the under layer flows into the auxiliary pole and the read shields. Patent document 1 does not take into account that a magnetic flux absorbed by the under layer flows into the auxiliary pole and the read shields. This problem must be solved to realize an HDD making use of perpendicular recording.

It is therefore a feature of the present invention to provide a magnetic head and a magnetic recording and reproduction apparatus, both of which minimize the data erasure problem which occurs when a stray field is applied parallel to the surface of the medium and are capable of high-density magnetic recording.

The magnetic head according to an embodiment of the present invention comprises (1) a read head having a lower shield, upper shield and magneto-resistive element sandwiched between the lower shield and the upper shield, and (2) a write head having a main pole and an auxiliary pole, wherein at least one of the auxiliary pole, lower shield and upper shield has a recessed portion whose height in the element height direction is lower than the height of its edges in the track width direction on a surface opposite to the air bearing surface. The edges in the track width direction of the auxiliary pole, lower shield or upper shield having the recessed portion are preferably recessed from the center portion in the element height direction on the air bearing surface side.

According to the present invention, when a stray field is applied to HDD, especially when a stray field is applied parallel to the medium of HDD, a magnetic field leaked from the edges of the auxiliary pole, lower shield and upper shield can be reduced, thereby making it possible to suppress the deterioration and erasure of a recording bit on the magnetic recording layer.

BRIEF DESCRIPTION OF THE DRAWINGS

FIGS. 5(a) and 5(b) show the structure of another magnetic head.

FIG. 10 shows a diagram (track width direction) of an erasure field generated from the return pole by a stray field in the magnetic head according to an embodiment of the present invention.

FIG. 13 shows a plan view of another example of the magnetic head of the present invention.

FIGS. 16(a) and 16(b) show plan views of another of the magnetic head of the present invention.

FIG. 17 shows a plan view of another example of the magnetic head of the present invention.

FIGS. 18(a) and 18(b) show plan views of another example of the magnetic head of the present invention.

FIG. 19 shows a plan view of another example of the magnetic head of the present invention.

DETAILED DESCRIPTION OF THE INVENTION

An exemplary embodiment of the present invention will be described hereinbelow with reference to the accompanying drawings. In the following drawings, the same functional elements are given the same reference symbols to facilitate understanding.

Figure 8:
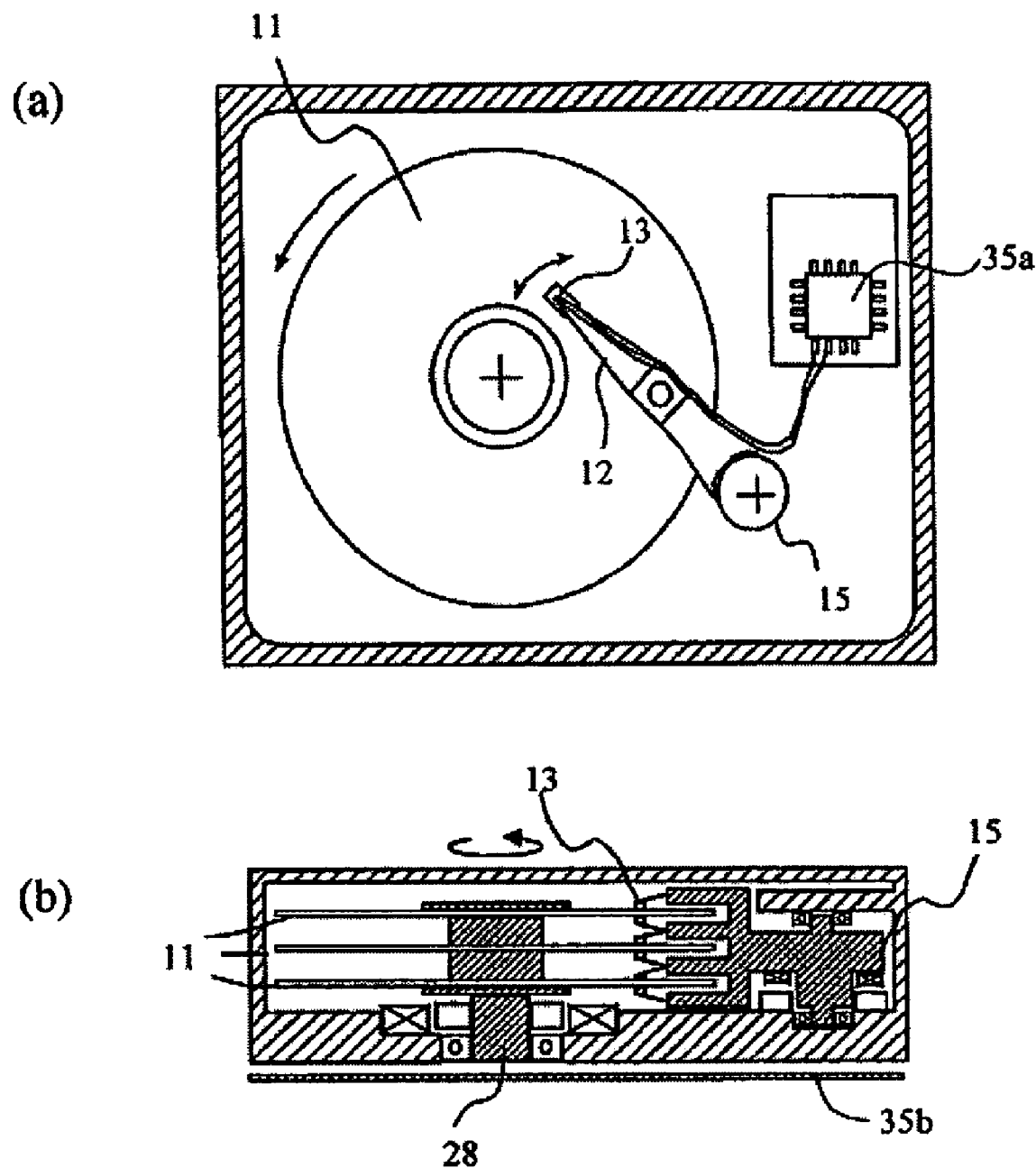
FIGS. 8(a) and 8(b) show schematic diagrams of a magnetic recording and reproduction apparatus.

FIGS. 8(a) and 8(b) are conceptual diagrams of a magnetic recording and reproduction apparatus according to the present invention. The magnetic recording and reproduction apparatus reads and writes a magnetization signal at a predetermined position on a magnetic disk (magnetic recording medium) turned by a motor 28 with a magnetic head mounted to a slider 13 fixed to the end of a suspension arm 12. By driving a rotary actuator 15, a position (track) in the radial direction of the magnetic disk of the magnetic head can be selected. A write signal to the magnetic head and a read signal from the magnetic head are processed by signal processing circuits 35a and 35b.

Figure 1:
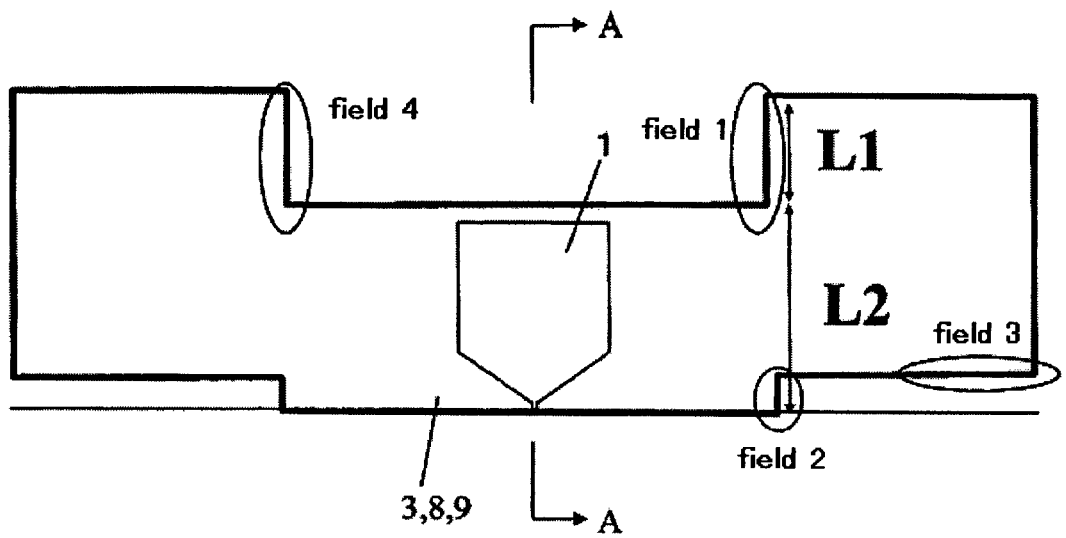
FIG. 1 shows a plan view of a magnetic head according to an embodiment of the present invention.
Figure 2:
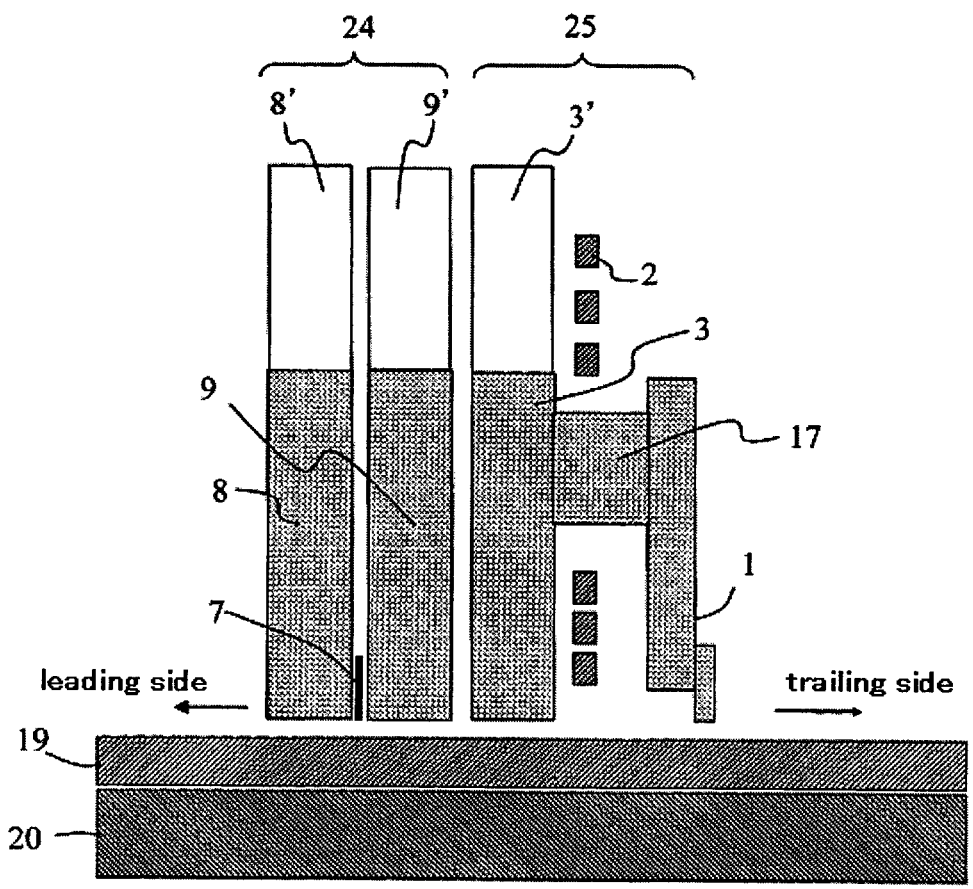
FIG. 2 shows a sectional view of the magnetic head of the present embodiment.

FIG. 1 is a plan view of a magnetic head according to an embodiment of the present invention, and FIG. 2 is a sectional view cut on A-A of FIG. 1. FIG. 2 also shows the section of the magnetic recording medium. This magnetic head is a read and write composite head comprising a write head 25 having a main pole 1 and an auxiliary pole 3 and a read head 24 having a read element 7. The main pole 1 and the auxiliary pole 3 are magnetically interconnected by a pillar 17 at a position away from the air bearing surface, and a thin film coil 2 is wound round a magnetic circuit composed of the main pole 1, auxiliary pole 3 and pillar 17. The read element 7 composed of a giant magneto-resistive element (GMR) or a tunneling magneto-resistive element (TMR) is interposed between a pair of magnetic shields (read shields) consisting of the lower shield 8 on the leading side and the upper shield 9 on the trailing side. The main pole 1 is arranged on the trailing side of the auxiliary pole 3. In the magnetic head in this embodiment, a recessed portion is formed on surfaces opposite to the air bearing surfaces of the auxiliary pole 3, the lower read shield 8 and the upper read shield 9 by making at least one level difference. In FIG. 2, the recessed portions are denoted by 3', 8' and 9'.

Figure 3:
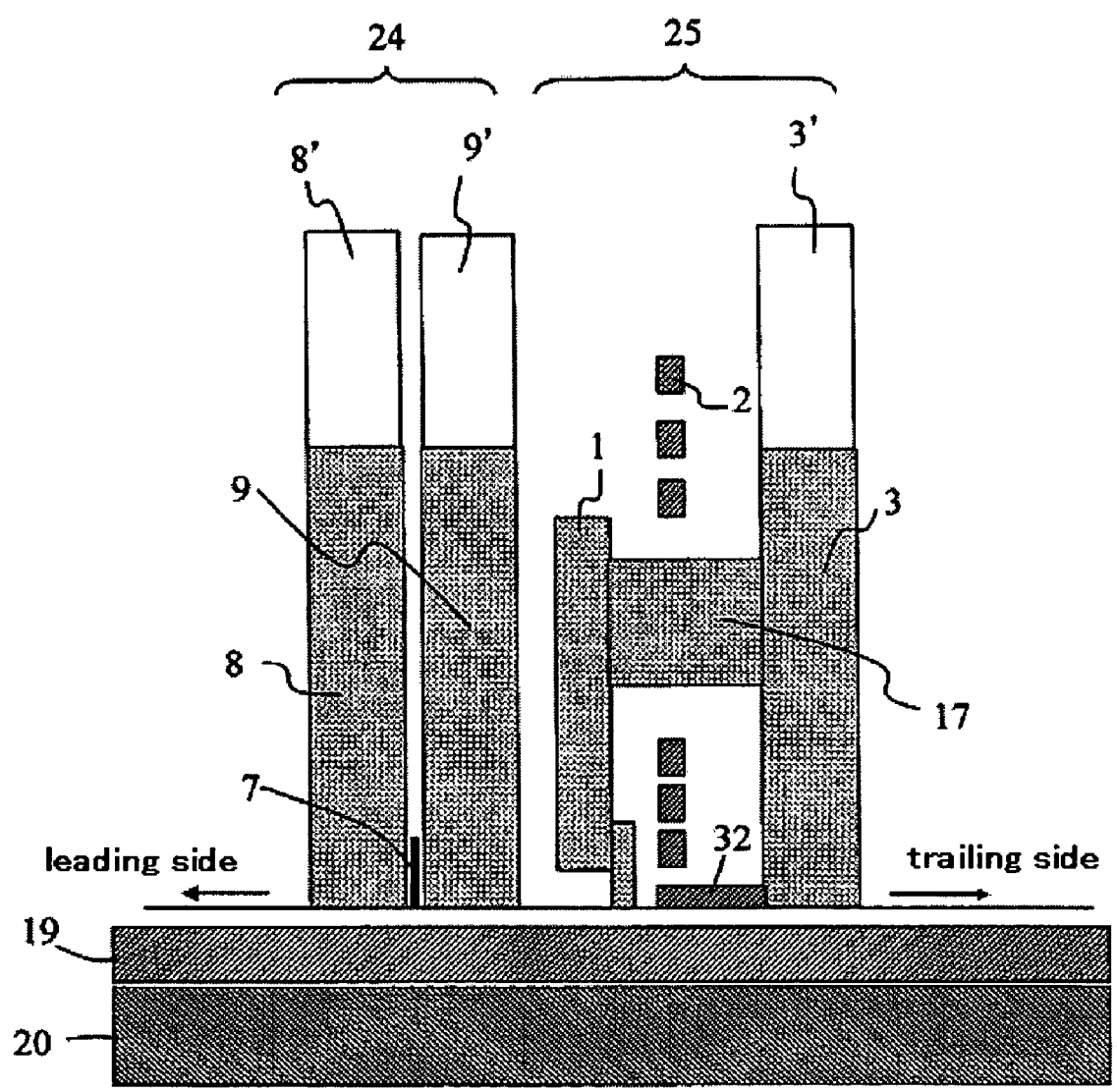
FIG. 3 shows a sectional view of another embodiment of the magnetic head of the present invention.

FIG. 3 is a sectional view of another example of the magnetic head of the present invention. The magnetic head shown in FIG. 3 differs from the magnetic head shown in FIG. 2 in the arrangement of the main pole 1 and the auxiliary pole 3 of the magnetic head 25. That is, the main pole 1 is arranged on the leading side of the auxiliary pole 3. A magnetic substance 32 for increasing field gradients is arranged on the trailing side of the main pole 1. Also in this magnetic head, a recessed portion is formed on surfaces opposite to the air bearing surfaces of the auxiliary pole 3, the lower read shield 8 and the upper read shield 9 by making at least one level difference like the magnetic head shown in FIG. 1 and FIG. 2. In FIG. 3, the recessed portions are denoted by 3', 8' and 9'.

In the prior art magnetic heads having a rectangular auxiliary pole 3, lower shield 8 and upper shield 9 shown in FIGS. 4(a) and 4(b) and FIGS. 5(a) and 5(b), when a stray field is applied to HDD, a magnetic field leaks from the auxiliary pole 3, lower shield 8 and upper shield 9 to erase data on the magnetic recording layer 19. In contrast to this, in the magnetic head of the above embodiment of the present invention, the end portions of the auxiliary pole 3, lower shield 8 and upper shield 9 are recessed from the air bearing surface and recessed portions are formed on surfaces opposite to the air bearing surfaces by making a level difference as shown in FIG. 1. This structure can suppress a magnetic field leaking from the auxiliary pole 3, lower shield and upper shield to prevent the erasure of information recorded on the magnetic recording layer 19.

Figure 4:
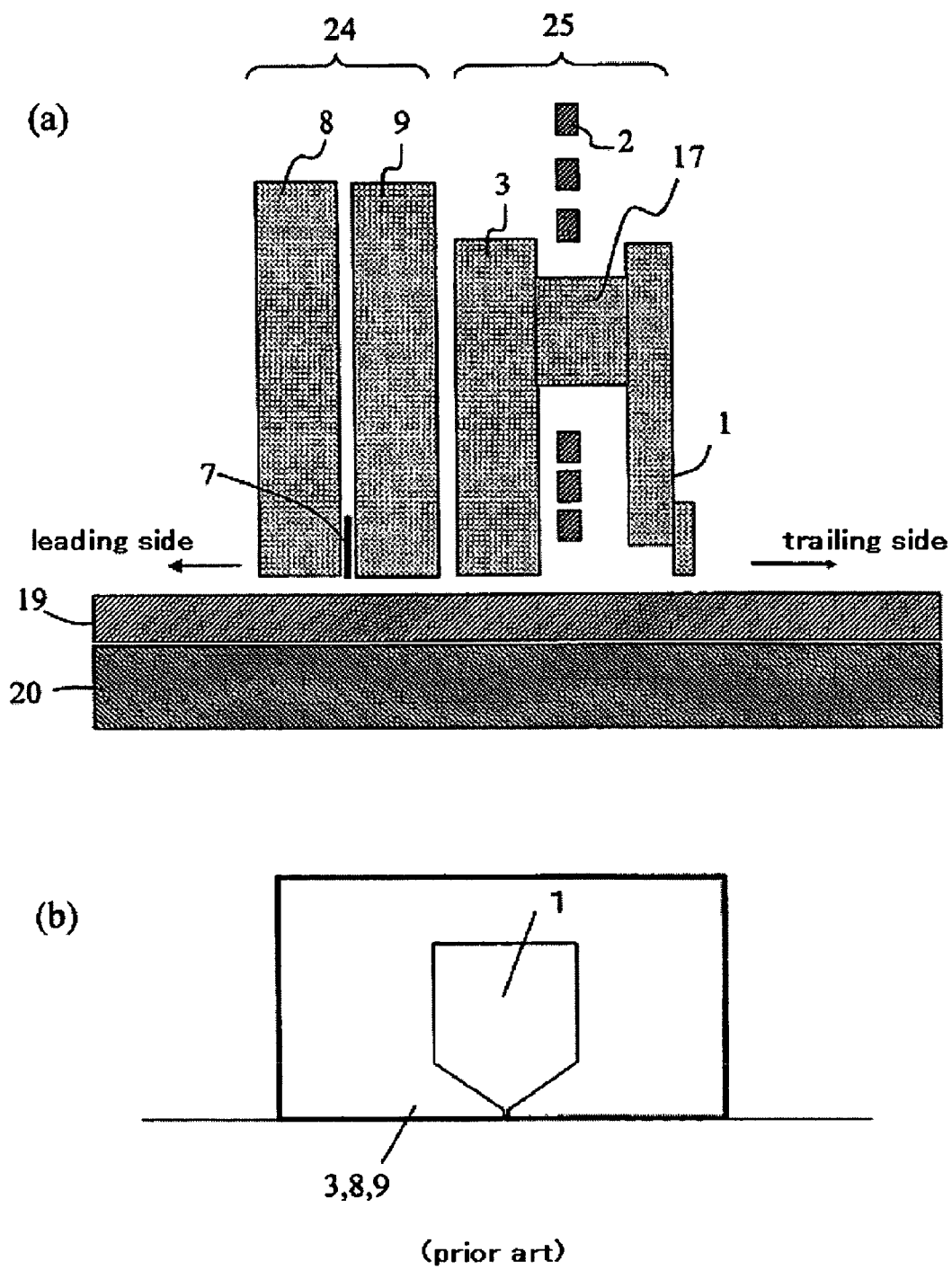
FIGS. 4(a) and 4(b) show the structure of a prior art magnetic head.
Figure 6:
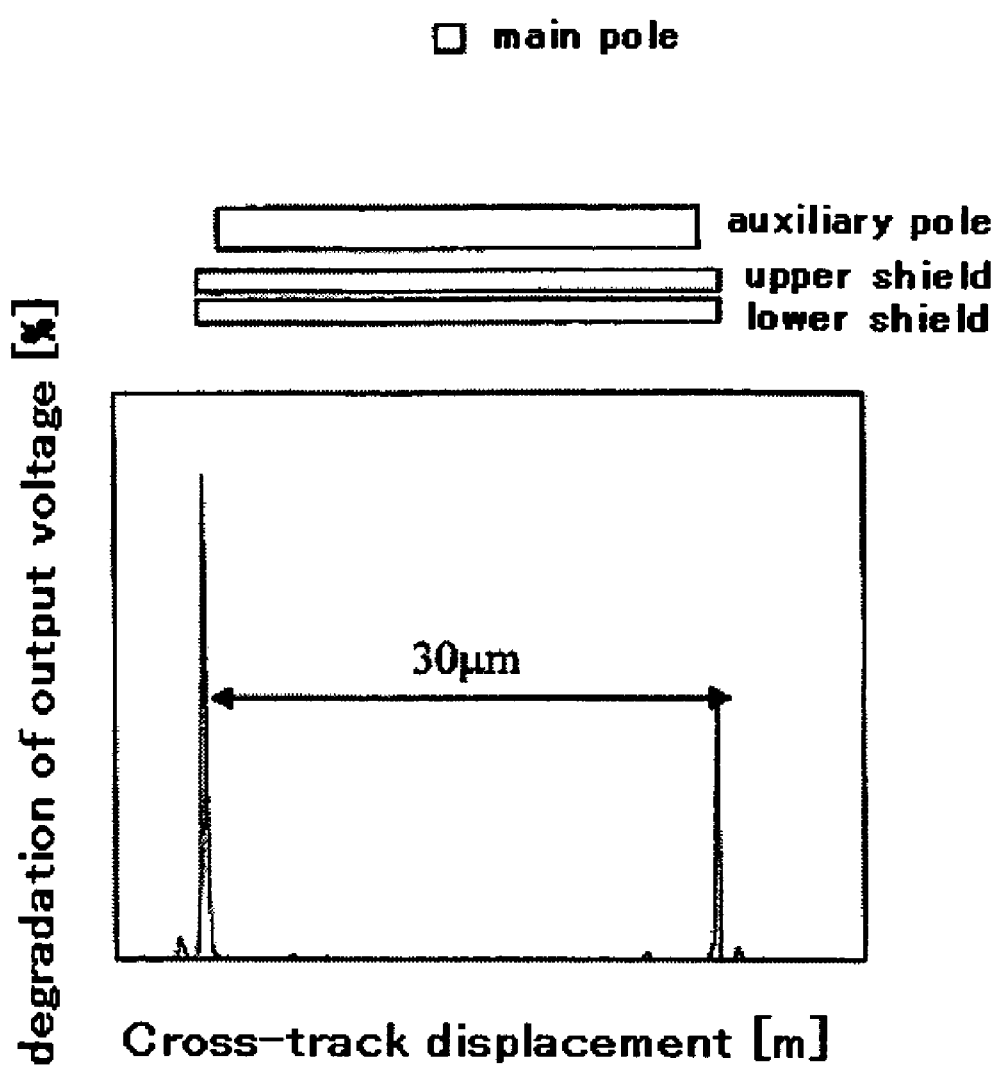
FIG. 6 shows the relationship between cross-track displacement and the degradation of output voltage of the prior art magnetic head.
Figure 7:
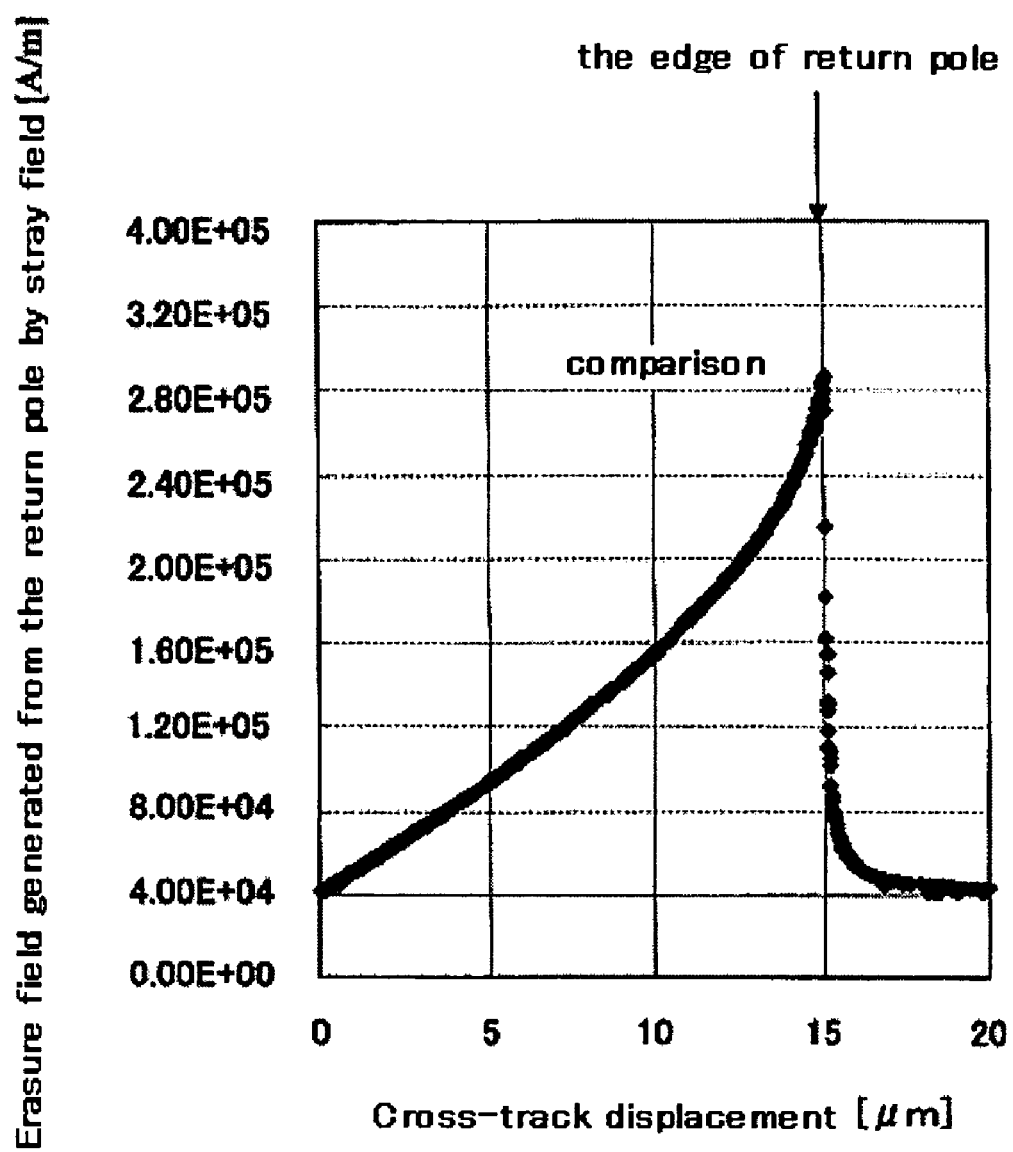
FIG. 7 shows an erasure field generated from the return pole by a stray field in the prior art magnetic head.

A magnetic field applied to the magnetic recording layer 19 from the edges of the return pole in the prior art magnetic head shown in FIG. 4 was calculated by 3-D magnetic field computation. For this computation, the recording track width of the main pole 1 was 150 nm and the film thickness of the main pole was 200 nm. The main pole was supposed to be made of CoNiFe. The auxiliary pole 3 was supposed to be made of a material having a saturation magnetic flux density of 1.0 T and have a width in the track width direction exposed to the air bearing surface of 30 μm, a length in the element height direction of 16 μm and a film thickness of 2 μm. The upper shield 9 was supposed to be made of 80 at % Ni-20 at % Fe having a saturation magnetic flux density of 1.0 T and have a width in the track width direction of 30 μm, a length in the element height direction of 16 μm and a film thickness of 1.2 μm. The lower shield 8 was supposed to be made of 80 at % Ni-20 at % Fe having a saturation magnetic flux density of 1.0 T and have a width in the track width direction of 30 μm, a length in the element height direction of 16 μm and a film thickness of 1.2 μm. The under layer 20 of the magnetic recording medium was supposed to be made of CoTaZr and have a distance from the head air bearing surface to the surface of the under layer 20 of 46 nm and a film thickness of 150 μm. The film thickness of the magnetic recording layer was supposed to be 20 nm.

In the case of the prior art magnetic head shown in FIG. 4, according to 3-D magnetic field computation, the maximum value of a magnetic field applied to the magnetic recording layer 19 from the edges of the return pole was $2.90 \times 10^5$ A/m. When this large magnetic field is applied to the recording layer, the recording bit is deteriorated or erased.

A magnetic field applied to the magnetic recording layer 19 from the edges of the return pole was also calculated by 3-D magnetic field computation for the magnetic heads of the present invention shown in FIG. 1, FIG. 2 and FIG. 3. The main pole was supposed to be made of CoNiFe. The auxiliary pole 3 was supposed to be made of a material having a saturation magnetic flux density of 1.0 T and have a total width in the track width direction of 90 μm, a width in the track width direction exposed to the air bearing surface of 30 μm, a length in the element height direction of 16 μm and a film thickness of 1 μm. The upper shield 9 was supposed to be made of 80 at % Ni-20 at % Fe having a saturation magnetic flux density of 1.0 T and have a total width in the track width direction of 90 μm, a width in the track width direction exposed to the air bearing surface of 30 μm, a length in the element height direction of 16 μm and a film thickness of 1.3 μm. The lower shield 8 was supposed to be made of 80 at % Ni-20 at % Fe having a saturation magnetic flux density of 1.0 T and have a total width in the track width direction of 90 μm, a width in the track width direction exposed to the air bearing surface of 30 μm, a length in the element height direction of 16 μm and a film thickness of 1.2 μm. The distance between the edges of the return pole and the edges of the upper and lower read shields and the air bearing surface was 2 μm. The under layer 20 of the magnetic recording medium was supposed to be made of CoTaZr and have a distance from the air bearing surface of the head to the surface of the under layer 20 of 46 nm and a film thickness of 150 nm. The film thickness of the magnetic recording layer was supposed to be 20 nm.

As for the magnetic head of the present invention comprising the auxiliary pole 3, lower shield 8 and upper shield 9 having shapes shown in FIG. 1, the maximum value of a magnetic field applied to the magnetic recording layer from the edges of the return pole calculated under the above conditions was $1.41 \times 10^5$ A/m. FIG. 10 shows a magnetic field distribution in the track width direction calculated by 3-D magnetic field computation. It is understood that the intensity of a magnetic field in the magnetic head having level differences of the present invention shown in FIG. 1 can be reduced to about 50% of that of the prior art magnetic head shown in FIG. 4.

Figure 11:
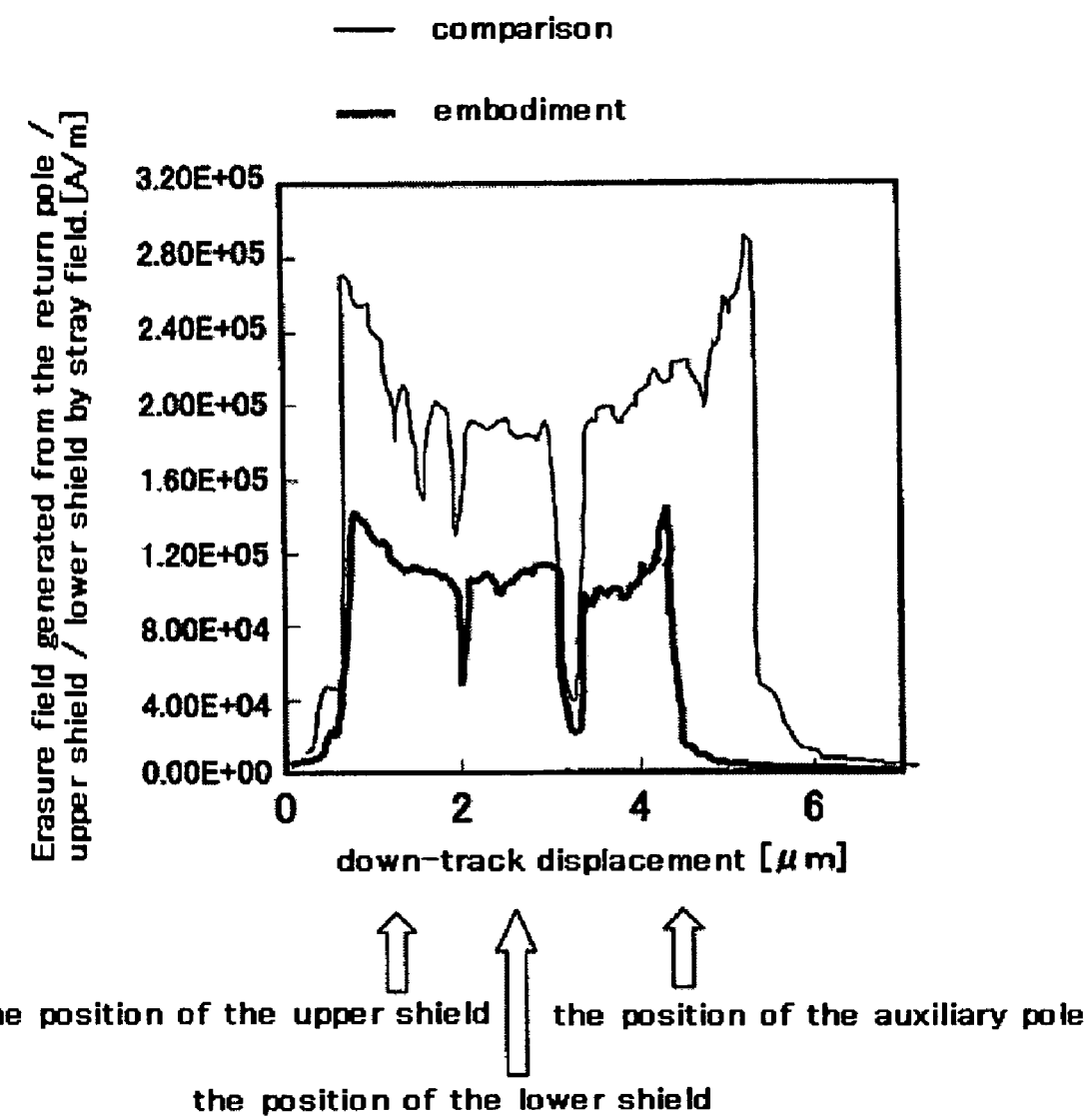
FIG. 11 shows a diagram (head traveling direction) of an erasure field generated from the return pole by a stray field in the magnetic head according to an embodiment of the present invention.

FIG. 11 shows a magnetic field distribution in the head traveling direction at positions opposed to the edges of the return pole, upper shield and lower shield exposed to the air bearing surfaces. It is seen that at all the positions, the magnetic field of the head of the present invention is smaller than the magnetic field of the prior art magnetic head.

Figure 21:
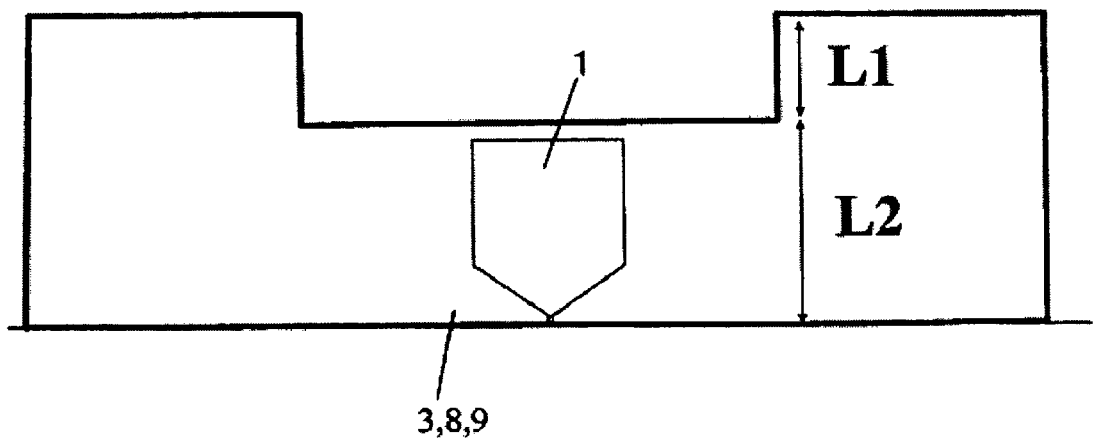
FIG. 21 shows a plan view of another example of the magnetic head of the present invention.

The function and effect obtained by making the auxiliary pole, upper shield and lower shield shaped as shown in FIG. 1 can be explained as follows. By making a level difference on surfaces opposite to the air bearing surfaces, magnetic charge appears at the edges of these elements. Magnetic charge having opposite polarity to that of the fields 2, 3 and 4 is generated at the edge of the magnetic substance in the field 1 of FIG. 1. Since a magnetic flux leaks from the edge of the field 1, the amount of a magnetic flux in the magnetic substance decreases due to a structure in which there is no edge formed by a level difference. As a result, a magnetic field applied from the edges of the return pole to the magnetic recording layer decreases. Even when there is no level difference on the air bearing surface as shown in FIG. 21, a magnetic field applied from the edges of the return pole to the magnetic recording layer can be reduced based on the same principle.

Figure 12:
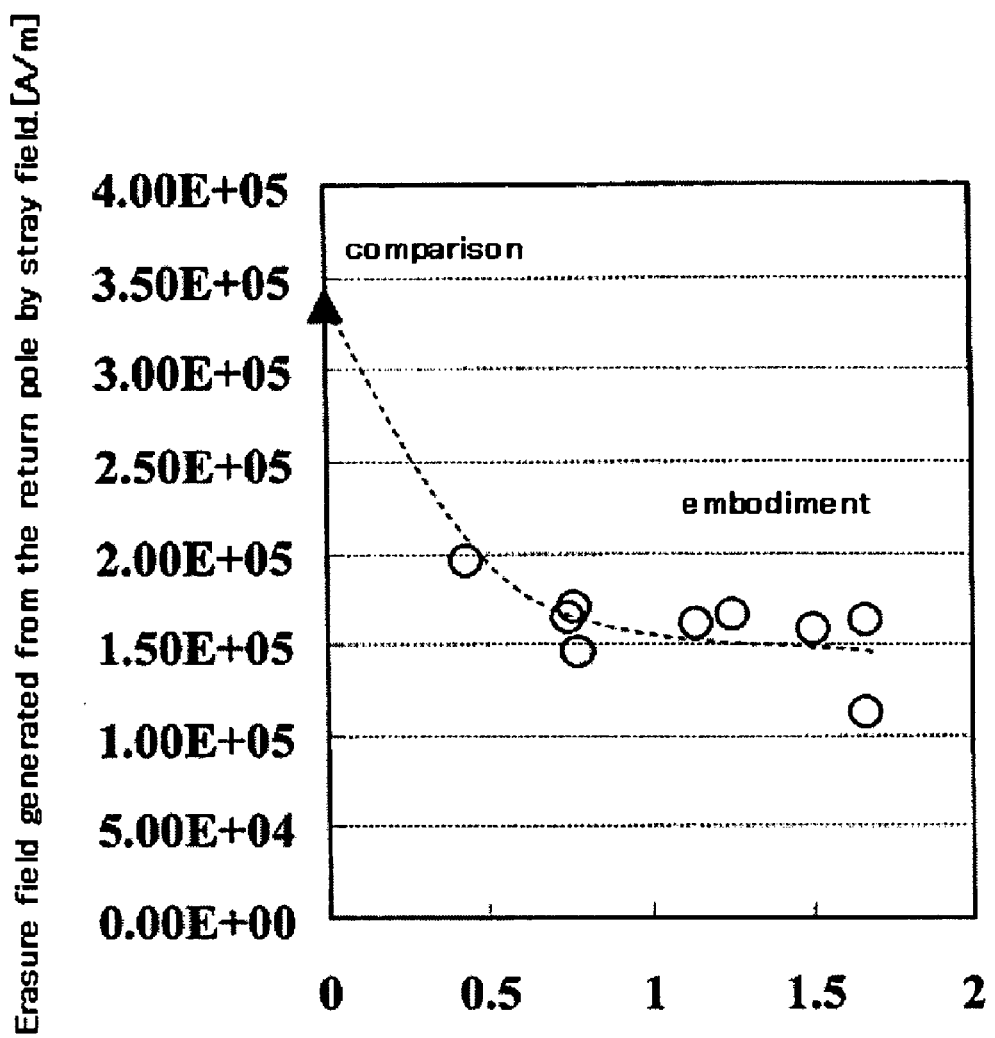
FIG. 12 shows the relationship between an erasure field generated from the return pole/lower shield/upper shield by a stray field in the magnetic head according to an embodiment of the present invention and the ratio of the length L1 of a recessed portion to the distance L2 from the position closest to the air bearing surface of the recessed portion to the air bearing surface.
Figure 1:
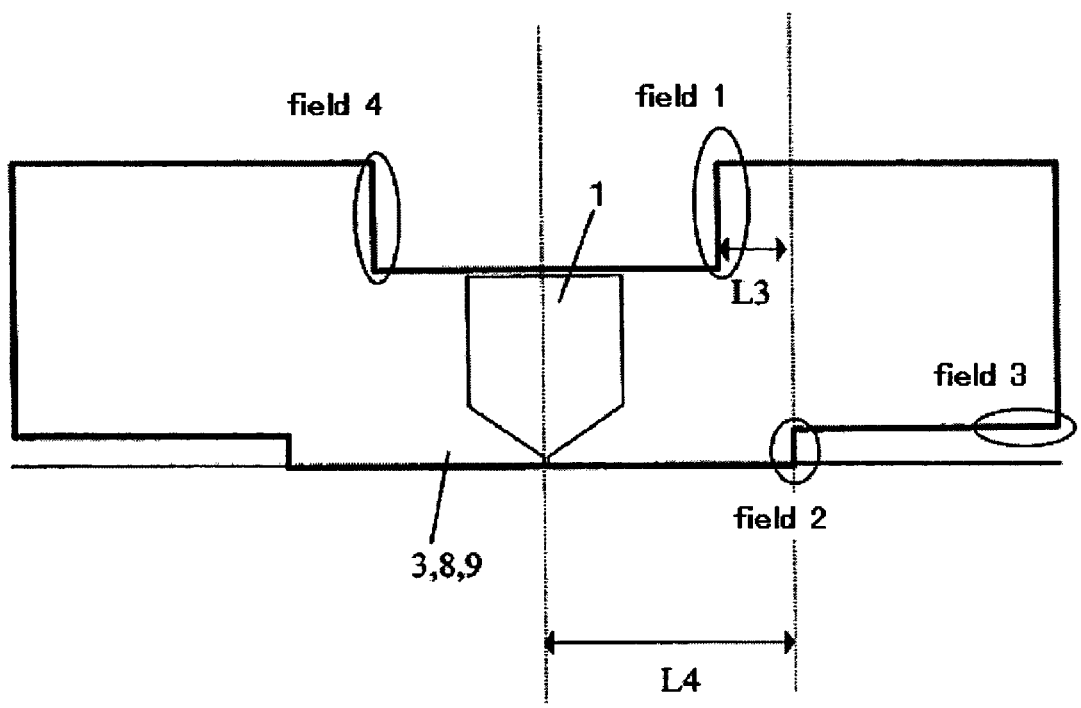

FIG. 12 shows the relationship between the ratio of the length L1 in the element height direction of a recessed portion formed on the surface opposite to the air bearing surface to the distance L2 from the position closest to the air bearing surface of the recessed portion to the air bearing surface and the maximum value of a magnetic field applied to the recording layer from the edges exposed to the air bearing surfaces of the auxiliary pole, upper shield and lower shield. It is understood that as the ratio (L1/L2) on the horizontal axis increases, the magnetic field decreases. This is because the effect becomes larger as magnetization in the portion L1 grows. The L1/L2 ratio is preferably about 0.5 or more. When the total of L1 and L2 is the same, L1 is preferably made larger.

Patent document 1 discloses a head having a discontinuous portion on the magnetic film constituting a magnetic path. However, patent document 1 does not take into consideration a reduction in erasure field by a stray field and does not obtain the effect of the present invention. In the computation of FIG. 12, the auxiliary pole was supposed to be made of 80 at % Ni-20 at % Fe having a saturation magnetic flux density of 1.0 T and have a total width in the track width direction of 90 μm, a width in the track width direction exposed to the air bearing surface of 30 μm, a length in the element height direction of 16 μm and a film thickness of 1.0 μm. The under layer 20 of the magnetic recording medium was supposed to be made of CoTaZr and have a distance from the head air bearing surface to the surface of the under layer 20 of 40 nm and a film thickness of 300 nm or 150 nm. The film thickness of the magnetic recording layer was supposed to be 20 nm.

Figure 14:
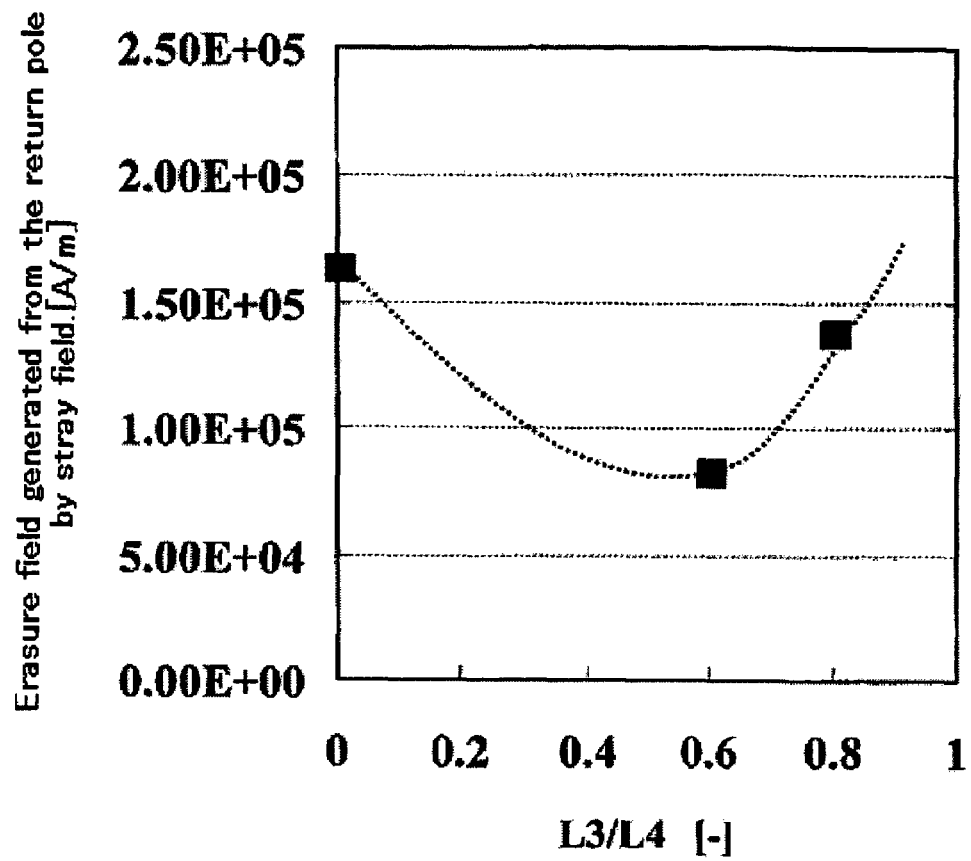
FIG. 14 shows the relationship between an erasure field generated from the return pole/lower shield/upper shield by a stray field in the magnetic head according to an embodiment of the present invention and a difference L3 in the track width direction between a level difference on the air bearing surface side and a level difference on the recessed portion side.

As shown in FIG. 13, the effect becomes large as the level difference on the recessed portion side is larger than the level difference on the air bearing surface side. FIG. 14 shows the relationship between the amount of a difference L3 in the track width direction between the level difference on the air bearing surface side and the level difference on the recessed portion side and the maximum value of a magnetic field applied to the recording layer from the edges exposed to the air bearing surfaces of the auxiliary pole, upper shield and lower shield. The horizontal axis shows the ratio of the amount of a difference L3 in the track width direction between the level difference on the air bearing surface side and the level difference on the recessed portion side to the length L4 from the center of the track to the level difference on the air bearing surface side. As understood from FIG. 14, when there is a difference L3 in the track width direction between the level difference on the air bearing surface side and the level difference on the recessed portion side, a magnetic field applied to the recording layer from the edges exposed to the air bearing surfaces of the auxiliary pole, upper shield and lower shield can be reduced. Although magnetic charge having opposite polarity to that of the fields 2, 3 and 4 is generated in the edge of the magnetic substance in the field 1 of FIG. 13, if there is a difference L3, a flow of the magnetic flux changes and has a larger influence upon the field 2, resulting in a reduction in the amount of a magnetic flux in the magnetic substance. When L3 is too large, the recessed portion becomes small, whereby the effect of the present invention is not obtained. The L3/L4 ratio is preferably about 0.5.

Figure 9:
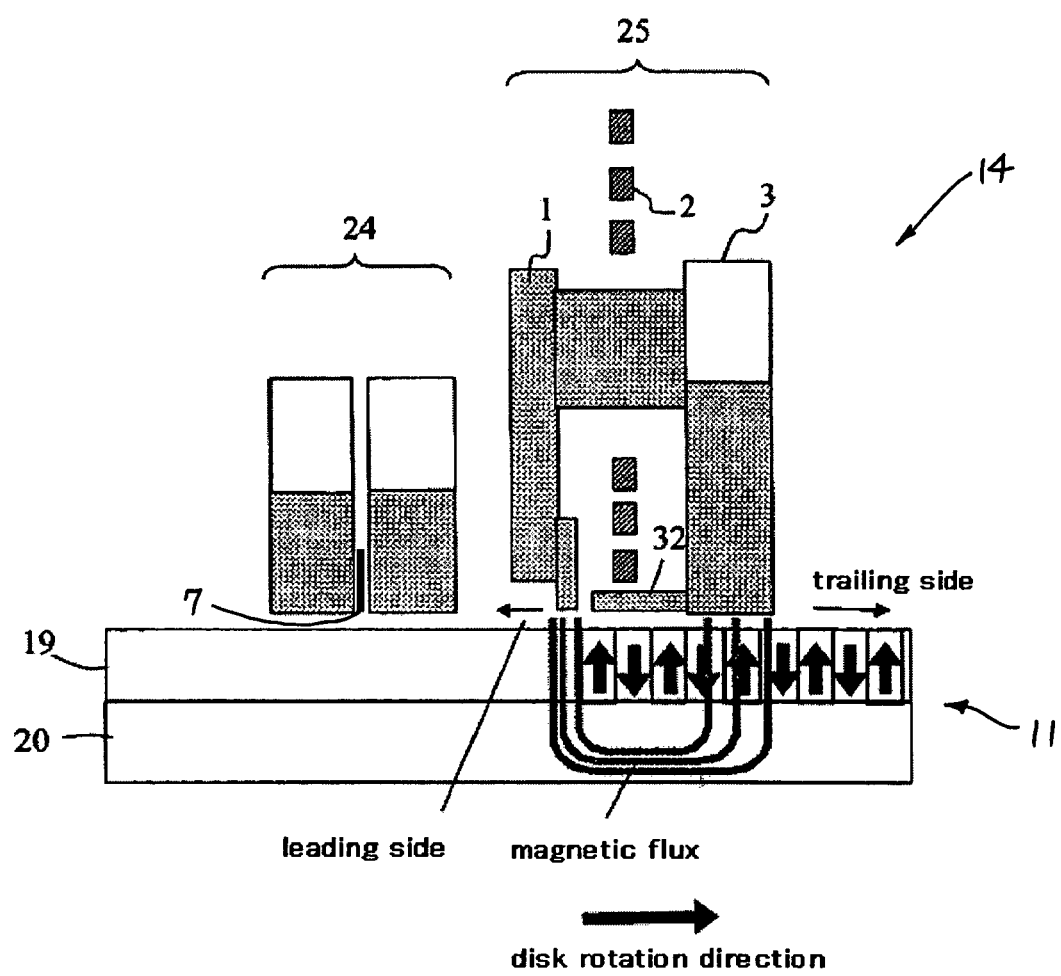
FIG. 9 shows a schematic diagram for explaining perpendicular recording.
Figure 1:
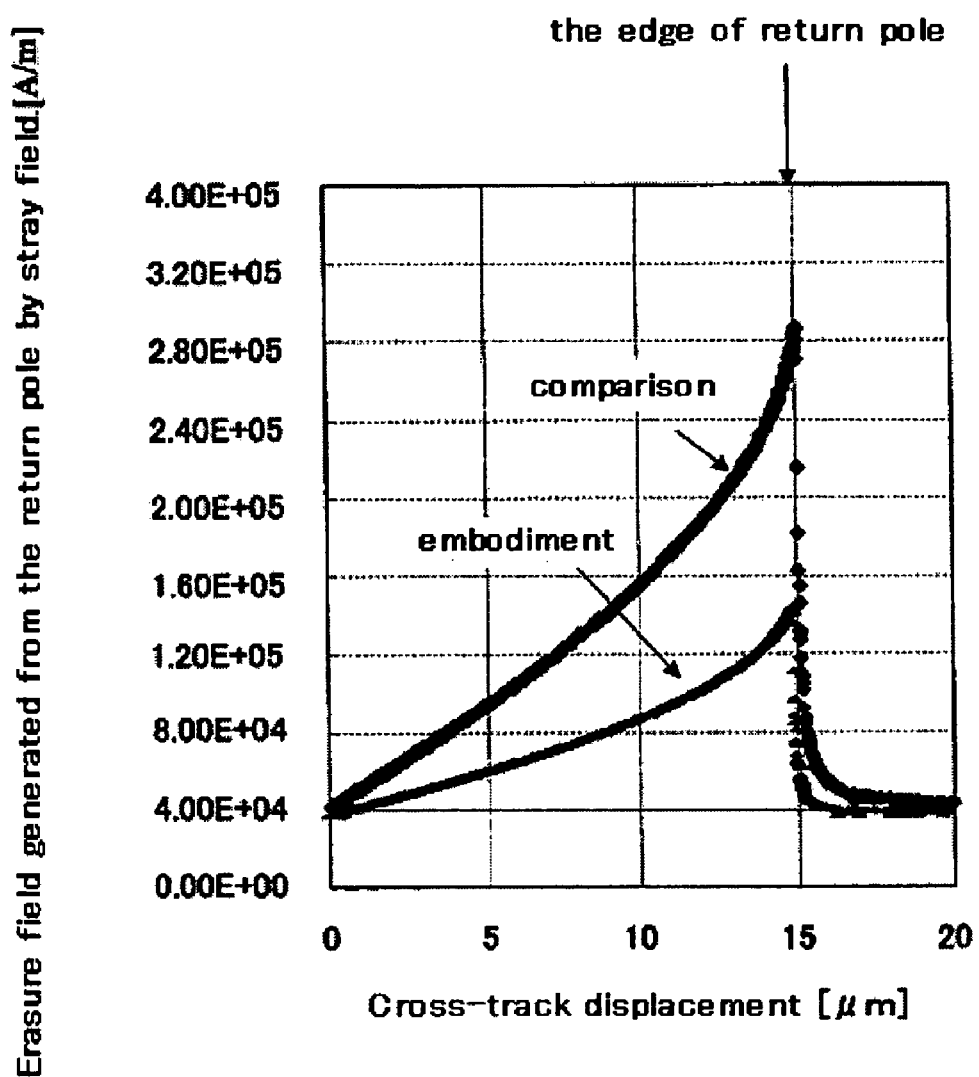

FIG. 9 schematically shows the relationship between the magnetic head 14 for perpendicular recording and the magnetic disk 11 and perpendicular recording. A magnetic field from the main pole 1 of the write head 25 forms a magnetic circuit which passes through the magnetic recording layer 19 and the soft under layer 20 of the magnetic disk medium 11 and enters the auxiliary pole 3 and records a magnetization pattern on the magnetic recording layer 19. An intermediate layer may be formed between the magnetic recording layer 19 and the soft under layer 20. A giant magneto-resistive element (GMR) or a tunneling magneto-resistive element (TMR) may be used as the read element 7 of the read head 24.

Figure 15:
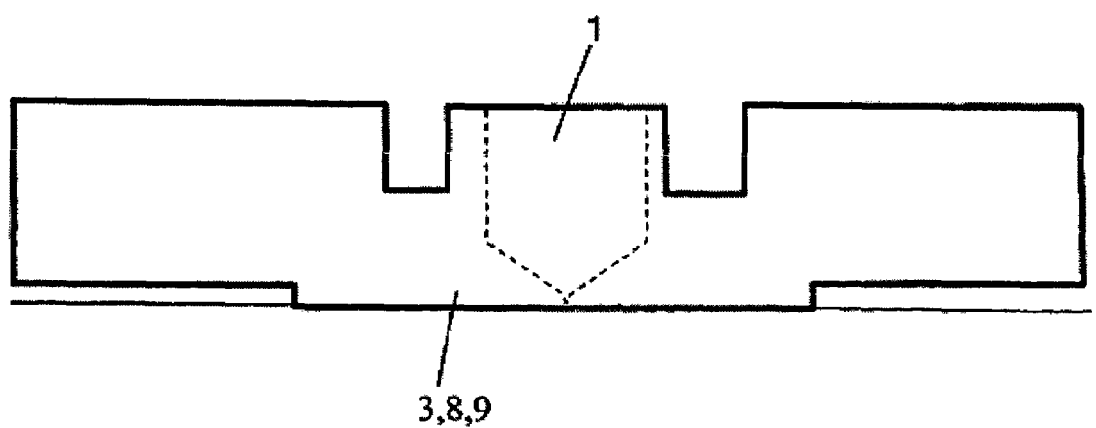
FIG. 15 shows a plan view of another example of the magnetic head of the present invention.
Figure 1:
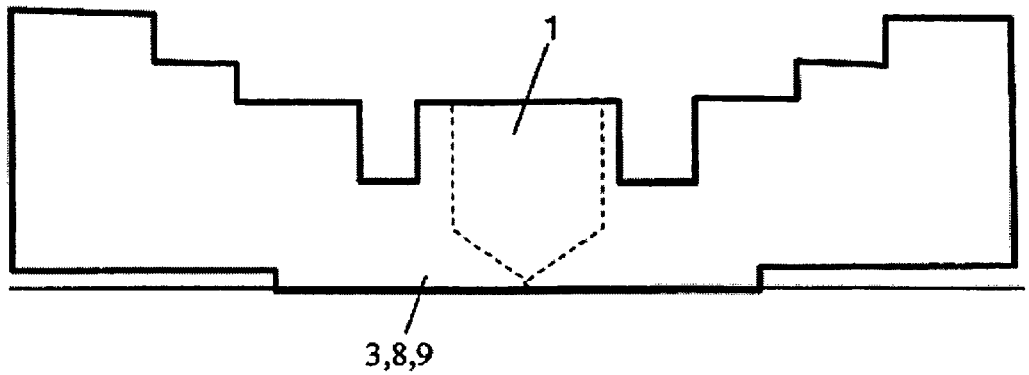
Figure 1:
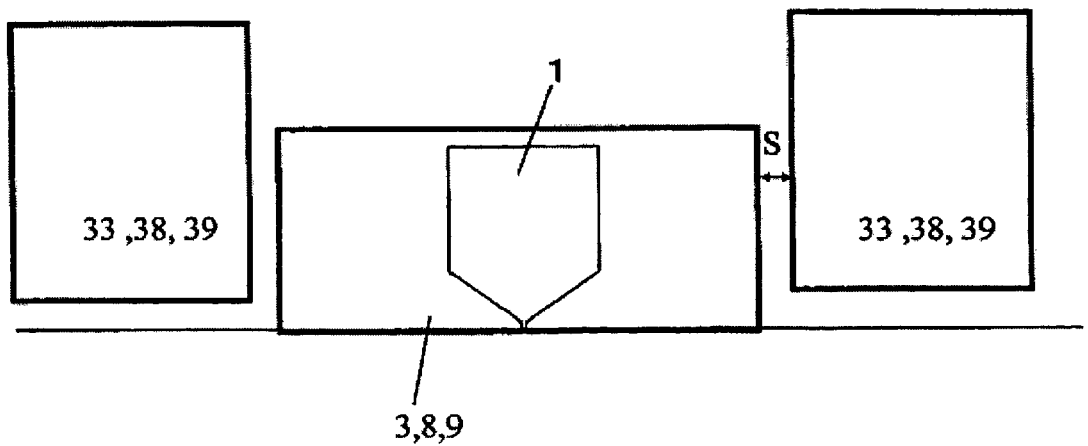

FIG. 15 is a plan view of another example of the magnetic head of the present invention. When the durability of a stray field applied in a direction perpendicular to the surface of the medium and entry of a write field into the read element are taken into consideration, the heights of the auxiliary pole, upper shield and lower shield elements are preferably small. In the magnetic head shown in this example, level differences are made on the surfaces opposite to the air bearing surfaces of the auxiliary pole 3, upper shield 9 and lower shield 8 to form a projection portion in order to provide a pillar for interconnecting the main pole 1 and the auxiliary pole 3. With this structure, a magnetic field applied from the auxiliary pole 3, lower shield 8 and upper shield 9 to the recording medium can be reduced.

FIGS. 16(a) and 16(b) are plan views of a further example of the magnetic head of the present invention. FIG. 16(a) is a plan view of the auxiliary pole 3 and FIG. 16(b) is a plan view of the upper shield and the lower shield. Since the lower shield 8 and the upper shield 9 do not need a back contact portion, as shown in FIG. 16(b), they do not have a projection portion and only the auxiliary pole 3 has a projection portion.

FIG. 17 is a plan view of another example of the magnetic head of the present invention. In this example, a plurality of recessed portions are formed on the surfaces opposite to the air bearing surfaces of the auxiliary pole 3, upper shield 9 and lower shield 8. With this structure, magnetic charge is generated on the surfaces having the level differences of recessed portions, thereby making it possible to reduce a magnetic field applied from the auxiliary pole 3, lower shield 8 and upper shield 9 to the recording medium.

FIGS. 18(a) and 18(b) are plan views of another example of the magnetic head of the present invention. In this example, a plurality of recessed portion which differ from one another in height in the element height direction are formed on the surfaces opposite to the air bearing surfaces of the auxiliary pole 3, upper shield 9 and lower shield 8. FIG. 18(a) shows a case where there are projection portions for back contact and FIG. 18(b) shows a case where only the auxiliary pole 3 has a projection portion for back contact and the lower shield 8 and the upper shield 9 have no projection portion for back contact.

FIG. 19 is a plan view of another example of the magnetic head of the present invention. In this example, the auxiliary pole, upper shield and lower shield are each composed of three magnetic substances magnetically connected to one another to form a recessed portion on the surfaces opposite to the air bearing surfaces of the auxiliary pole, upper shield and lower shield. Rectangular magnetic substances 33 extending up to a position higher than the auxiliary pole 3 in the element height direction are arranged on both sides of the rectangular auxiliary pole 3 with a space S therebetween. Similarly, rectangular magnetic substances 38 extending up to a position higher than the lower shield 8 in the element height direction are arranged on both sides of the rectangular lower shield 8 with a space S therebetween, and rectangular magnetic substances 38, 39 extending up to a position higher than the upper shield 9 in the element height direction are arranged on both sides of the rectangular upper shield 9 with a space S therebetween. With this structure, the same effect as that obtained by the structure shown in FIG. 1 is also obtained. Since the above effect is not obtained when the space S between the magnetic substance at the center and the magnetic substances on both sides expands, the space S between the magnetic substances at the center and on both sides is preferably about 2 μm or less.

Figure 20:
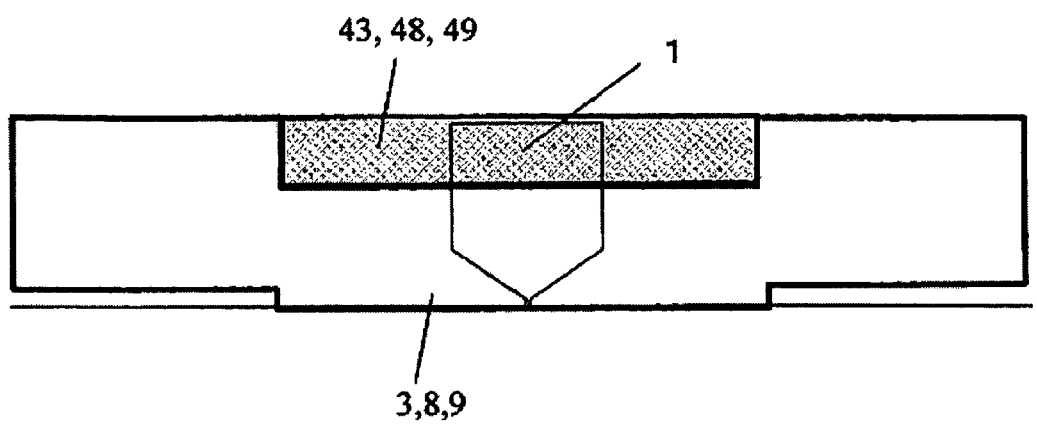
FIG. 20 shows a plan view of another example of the magnetic head of the present invention.

FIG. 20 is a plan view of another example of the magnetic head of the present invention. In the magnetic head of this example, a recessed portion is formed on the surfaces opposite to the air bearing surfaces of the auxiliary pole, upper shield and lower shield and filled with a material having lower permeability than the auxiliary pole, upper shield and lower shield, the recessed portion of the lower shield 8 is filled with a material 48 having low permeability, and the recessed portion of the upper shield 9 is filled with a material 49 having low permeability. Due to a difference in permeability among the auxiliary pole, upper shield and lower shield of this example, a flow of the magnetic flux changes, thereby making it possible to reduce a magnetic field applied from the auxiliary pole 3, lower shield 8 and upper shield 9 to the recording medium. In this example, the materials filled in the recessed portions have a specific permeability which is about 500 lower than those of the auxiliary pole, upper shield and lower shield. When the difference of permeability is smaller than 500, a desired effect may not be obtained. The magnetic material 43 of the recessed portion can be advantageously used as a back contact bonding portion. For example, when the auxiliary pole 3, lower shield 8 and upper shield 9 are made of 80 at % Ni-20 at % Fe, 45 at % Ni-55 at % Fe having lower permeability than that of the above material may be used in the recessed portions of the auxiliary pole 43, lower shield 49 and upper shield 49.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head comprising (1) a perpendicular write head having a main pole and an auxiliary pole and (2) a read head having a lower shield, an upper shield and a magneto-resistive element formed between the lower shield and the upper shield, wherein
at least one of the auxiliary pole, lower shield and upper shield has a recessed portion, whose height in an element height direction is lower than the height of edges thereof in a track width direction, on a surface opposite to the air bearing surface.

2. The magnetic head according to claim 1, wherein the width in the track width direction of the recessed portion is smaller than the width in the track width direction of a portion exposed to the air bearing surface of the auxiliary pole, lower shield or upper shield where the recessed portion is formed.

3. The magnetic head according to claim 1, wherein the auxiliary pole is formed on a trailing side of the main pole.

4. The magnetic head according to claim 1, wherein when the depth of the recessed portion is represented by L1 and the distance between a bottom of the recessed portion and the air bearing surface is represented by L2, L1/L2 is about 0.5 or more.

5. The magnetic head according to claim 1, wherein the recessed portion is filled with a magnetic material and the permeability of the magnetic material filled is lower than the permeability of the auxiliary pole, lower shield or upper shield.

6. The magnetic head according to claim 1, wherein the edges in the track width direction of the auxiliary pole, lower shield or upper shield having the recessed portion are recessed from a center portion in the element height direction on the air bearing surface side.

7. The magnetic head according to claim 6, wherein the edges recessed from the center portion in the track width direction are filled with a magnetic material and the permeability of the magnetic material is lower than the permeability of the auxiliary pole, lower shield or upper shield having the recessed portion.

8. The magnetic head according to claim 1 which has a plurality of the recessed portions.

9. The magnetic head according to claim 1, wherein a bottom of the recessed portion is lower than the main pole in the element height direction.

10. The magnetic head according to claim 9, wherein the auxiliary pole has a projection portion for back contact with the main pole on the surface opposite to the air bearing surface.

11. A magnetic recording and reproduction apparatus comprising:
a magnetic recording medium having a magnetic recording layer and a soft under layer;
a medium drive unit configured to drive the magnetic recording medium;
a magnetic head for writing and reading from the magnetic recording medium; and
a magnetic head drive unit configured to drive the magnetic head relative to the magnetic recording medium, wherein
the magnetic head comprises (1) a perpendicular write head having a main pole and an auxiliary pole and (2) a read head having a lower shield, an upper shield and a magneto-resistive element formed between the lower shield and the upper shield, wherein
at least one of the auxiliary pole, lower shield and upper shield has a recessed portion, whose height in an element height direction is lower than the height of thereof in a track width direction, on a surface opposite to the air bearing surface.

12. The magnetic head according to claim 11, wherein the width in the track width direction of the recessed portion is smaller than the width in the track width direction of a portion exposed to the air bearing surface of the auxiliary pole, lower shield or upper shield where the recessed portion is formed.

13. The magnetic head according to claim 11, wherein the auxiliary pole is formed on a trailing side of the main pole.

14. The magnetic head according to claim 11, wherein when the depth of the recessed portion is represented by Li and the distance between a bottom of the recessed portion and the air bearing surface is represented by L2, L1/L2 is about 0.5 or more.

15. The magnetic head according to claim 11, wherein the recessed portion is filled with a magnetic material and the permeability of the magnetic material filled is lower than the permeability of the auxiliary pole, lower shield or upper shield.

16. The magnetic head according to claim 11, wherein the edges in the track width direction of the auxiliary pole, lower shield or upper shield having the recessed portion are recessed from a center portion in the element height direction on the air bearing surface side.

17. The magnetic head according to claim 16, wherein the edges recessed from the center portion in the track width direction are filled with a magnetic material and the permeability of the magnetic material is lower than the permeability of the auxiliary pole, lower shield or upper shield having the recessed portion.

18. The magnetic head according to claim 11 which has a plurality of the recessed portions.

19. The magnetic head according to claim 11, wherein a bottom of the recessed portion is lower than the main pole in the element height direction.

20. The magnetic head according to claim 19, wherein the auxiliary pole has a projection portion for back contact with the main pole on the surface opposite to the air bearing surface.

* * * * *

UNITED STATES PATENT AND TRADEMARK OFFICE
CERTIFICATE OF CORRECTION

PATENT NO. : 7,483,243 B2  Page 1 of 1
APPLICATION NO. : 11/252913
DATED : January 27, 2009
INVENTOR(S) : Fukui et al.

It is certified that error appears in the above-identified patent and that said Letters Patent is hereby corrected as shown below:

In the Claims:

Claim 14, Column 10, Line 24, please delete "Li" and insert --L1--.

Signed and Sealed this

Twenty-fourth Day of March, 2009

JOHN DOLL
*Acting Director of the United States Patent and Trademark Office*